United States Patent
Son et al.

(10) Patent No.: US 8,051,461 B2
(45) Date of Patent: Nov. 1, 2011

(54) SYSTEM AND METHOD FOR ESTABLISHING SECURED CONNECTION BETWEEN HOME NETWORK DEVICES

(75) Inventors: Kyoung-ho Son, Seoul (KR); Tae-jin Jeong, Seoul (KR); Hyun-gyoo Yook, Seoul (KR); Joo-yeol Lee, Seoul (KR); Jae-shin Lee, Seoul (KR); Dong-shin Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1742 days.

(21) Appl. No.: 11/285,278

(22) Filed: Nov. 23, 2005

(65) Prior Publication Data

US 2006/0112417 A1    May 25, 2006

(30) Foreign Application Priority Data

Nov. 23, 2004 (KR) .................. 10-2004-0096456

(51) Int. Cl.
  *H04L 9/32* (2006.01)
  *G06F 17/30* (2006.01)
  *G06F 7/04* (2006.01)
(52) U.S. Cl. ............................... 726/2; 726/3
(58) Field of Classification Search ............ 726/2, 3
  See application file for complete search history.

(56) References Cited

U.S. PATENT DOCUMENTS

| | | | |
|---|---|---|---|
| 2003/0236889 A1* | 12/2003 | Manion et al. | 709/227 |
| 2004/0083303 A1* | 4/2004 | Hwang | 709/232 |
| 2005/0021852 A1* | 1/2005 | Accarie et al. | 709/245 |
| 2005/0132366 A1* | 6/2005 | Weast | 718/1 |
| 2005/0172101 A1* | 8/2005 | Mach | 712/2 |
| 2005/0240758 A1* | 10/2005 | Lord et al. | 713/153 |

FOREIGN PATENT DOCUMENTS

| | | |
|---|---|---|
| JP | 2003-284152 A | 10/2003 |
| JP | 2004-320741 A | 11/2004 |
| KR | 10-2004-0014731 A | 2/2004 |
| KR | 10-2004-0021305 A | 3/2004 |
| KR | 10-2004-0063388 A | 7/2004 |

OTHER PUBLICATIONS

Fukuda, Naohiro: "Computer & Network LAN (Apr. 2004) No. 246", Security Measures for Internet Electronic Appliances.

* cited by examiner

*Primary Examiner* — Kambiz Zand
*Assistant Examiner* — Aubrey Wyszynski
(74) *Attorney, Agent, or Firm* — Sughrue Mion, PLLC

(57) ABSTRACT

A system and method for establishing a secured connection between home network devices are provided. Particularly, a system and method for establishing a secured connection between a home network including a plurality of non-secured Universal Plug and Play (UPnP) devices and a secured external UPnP device by creating virtual UPnP devices for the respective corresponding non-secured UPnP devices are provided. The system for establishing a secured connection between home network devices includes a virtual UPnP device creation unit which creates a secured virtual UPnP device for a non-secured UPnP device, an information storage unit which stores correspondence information regarding the non-secured UPnP device and the virtual UPnP device, and a secured communication unit which securely communicates with a secured UPnP device with reference to the correspondence information.

15 Claims, 9 Drawing Sheets

SYSTEM AND METHOD FOR ESTABLISHING SECURED CONNECTION BETWEEN HOME NETWORK DEVICES

CROSS-REFERENCE TO RELATED APPLICATION

This application claims priority from Korean Patent Application No. 10-2004-0096456 filed on Nov. 23, 2004 in the Korean Intellectual Property Office, the disclosure of which is incorporated herein by reference in its entirety.

BACKGROUND OF THE INVENTION

1. Field of the Invention

The present invention relates to a system and method for establishing a secured connection between home network devices, and more particularly, to a system and method for establishing a secured connection between home network devices, in which a virtual Universal Plug and Play (UPnP) module is generated in a home network comprising a plurality of non-secured UPnP devices and a secured connection is established between any of the non-secured UPnP devices and a secured UPnP device that wishes to participate in the home network using the virtual UPnP module.

2. Description of the Related Art

Recently, various middleware technologies have been developed to control devices connected to a network. Of the middleware technologies, UPnP and Home Audio/Video Interoperability (HAVi) provide standards prescribing data communication between devices constituting a network, thereby facilitating adding devices to the network and controlling the same. The UPnP architecture is particularly well suited for networks associated with various types of devices, such as information home appliances, wireless devices, and personal computers (PCs), to one another by a standardized method of connecting devices to one another without efforts from users, administrators or manufacturers in a network associated with a local setting such as a home or a business, etc., providing a connection to the Internet to each of the devices.

UPnP is an extension of Plug and Play (PnP) and, unlike PnP that requires a PC to control the connection of devices to a network, does not require a user to carry out any specific operations to connect devices to a network. With UPnP, a device can dynamically join a network, obtain an Internet Protocol (IP) address, convey its capabilities, and learn about the presence and capabilities of other devices (that is, operate within a zero configuration device network architecture). Devices can subsequently communicate with each other directly, thereby enabling discovery and control of devices (that is, consolidate a peer-to-peer networking).

The process involved in UPnP networking includes addressing, discovery, description, control, eventing and presentation. A device is given an appropriate address, examines a list of services that it supports using a simple service discovery protocol, and provides the service list to a control point. The control point is a controller capable of examining the states of other devices and controlling the other devices based on the examined results. Whenever the service state of the device changes, an event server transmits an event message to the control point.

The control point obtains a general description of the device from a discovery message and a Uniform Resource Locator (URL) provided by the device in order to make the device interoperable with other devices.

For a better understanding of the services provided by the device, the control point secures detailed UPnP descriptions of the services and issues a request for performing of the services to the device in order to control the device. When the state of the device changes, the device notifies the control point of a change in its state by sending an event message to the control point, and thus, the control point can smoothly control the device with reference to the event message.

As the necessity of security in home networks grows, an increasing number of secured UPnP technologies have been developed. Secured UPnP, which is UPnP providing a security function, provides various standards regarding a secured control point and a secured controlled device that allow only a secured control point having a predetermined access right to access a secured controlled device, thereby establishing a secured connection between the secured control point and the secured controlled device.

For a secured connection between a secured control point and a secured controlled device, the secured controlled device must store an access control list (ACL) specifying detailed access right settings, and the secured control point must additionally perform management procedures for setting a connection to the secured controlled device and providing security during the controlling of the secured controlled device.

In detail, the ACL includes a plurality of setting values specifying the right to access the secured controlled device, and each of the setting values includes a description of a control point to which the right to access the secured controlled device is allotted, and a list of items accessible by the control point.

The secured control point includes authentication and encryption information for establishing a connection to the secured controlled device and communicates with the secured controlled device by transmitting/receiving data encrypted using a pair of symmetric keys to/from the secured controlled device.

Figure 1:
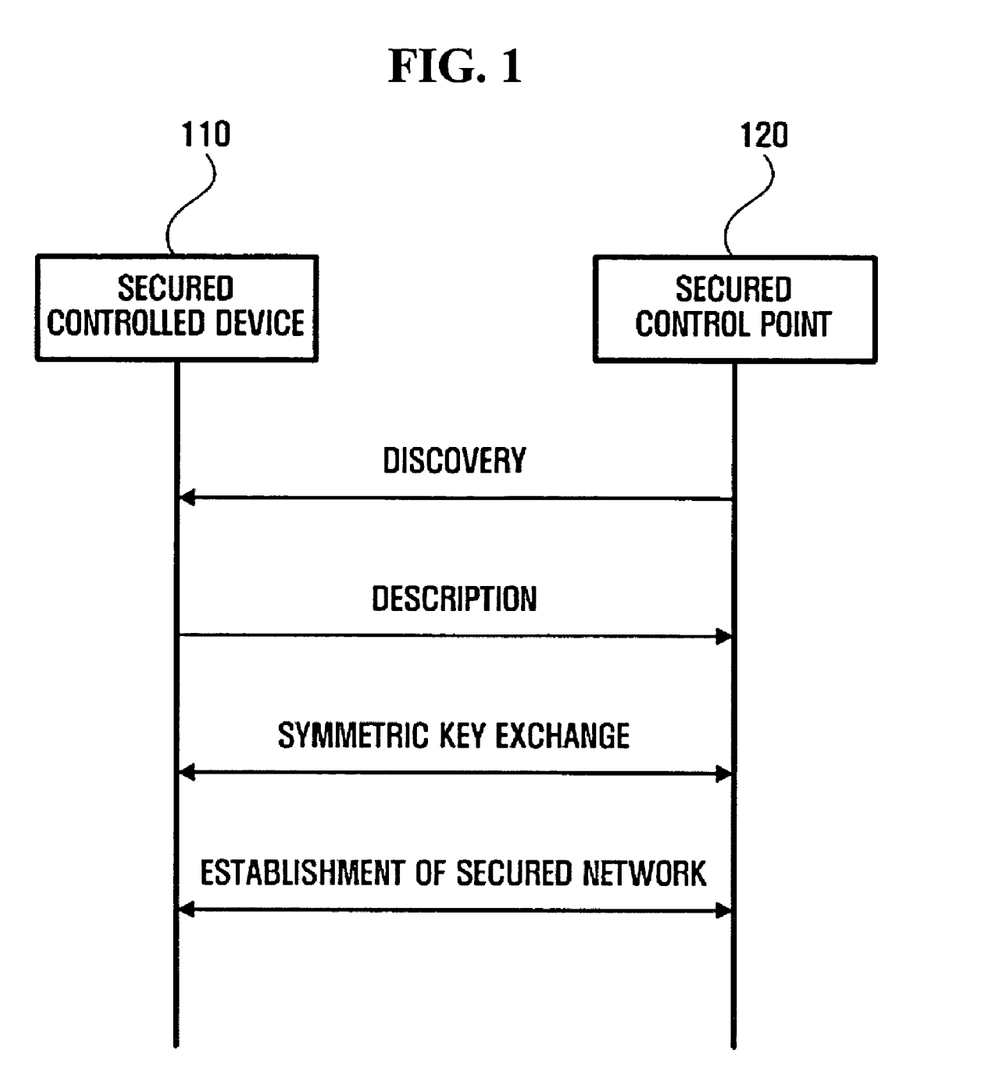
FIG. 1 is a flowchart illustrating a conventional method of establishing a connection between two secured UPnP devices, particularly, between a secured control point and a secured controlled device.

FIG. 1 is a flowchart illustrating a conventional method of establishing a connection between two UPnP devices, i.e., a secured control point 120 and a secured controlled device 110.

Referring to FIG. 1, the secured control point 120 discovers the secured controlled device 110 (DISCOVERY), and the secured controlled device 110 transmits its description to the secured control point 120 (DESCRIPTION). The secured control point 120 receives a public key from the secured controlled device 110 and generates a session key required for transmitting/receiving a message to/from the secured controlled device 110 using the public key. The session key is used for signing or encrypting a message.

Figure 2:
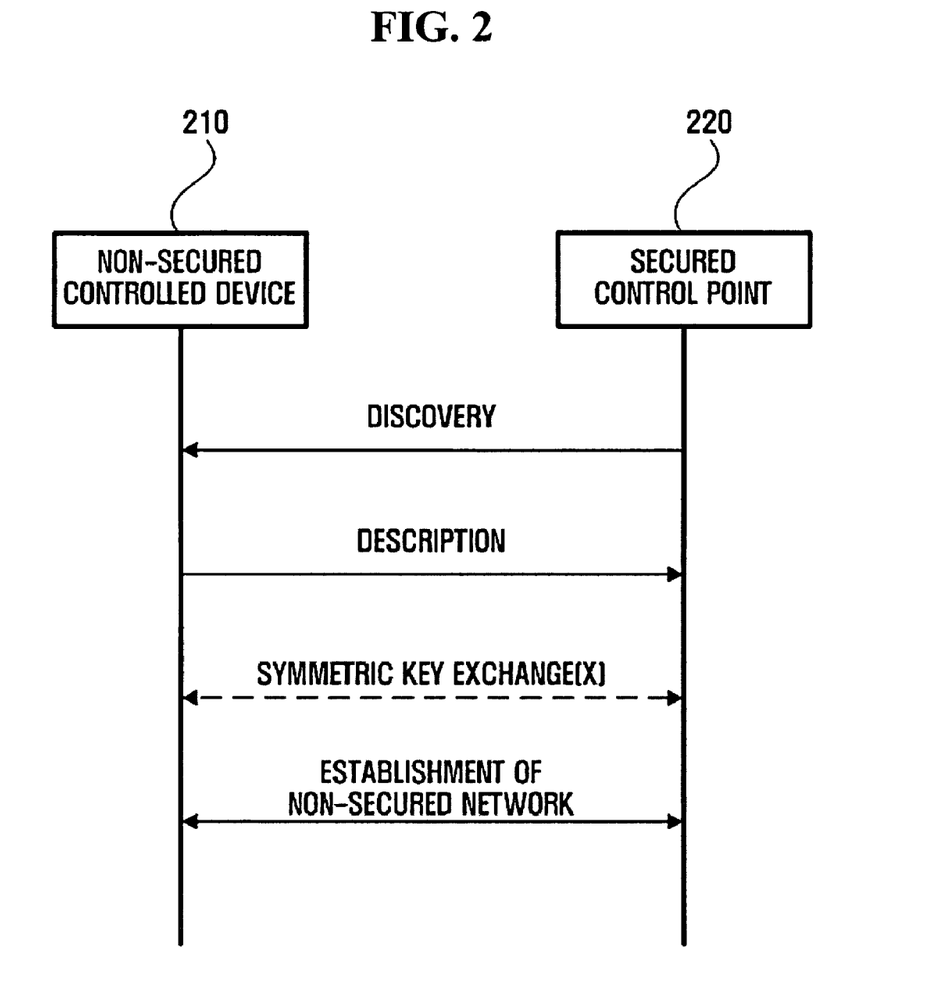
FIG. 2 is a flowchart illustrating a conventional method of establishing a connection between a secured control point and a non-secured controlled device.

FIG. 2 is a flowchart illustrating a conventional method of establishing a connection between a secured control point 220 and a non-secured controlled device 210.

Referring to FIG. 2, in a home network comprising the secured control point 220 and the non-secured controlled device 210, the secured control point 220 is always allowed to access the non-secured controlled device 210 without the need to receive a public key from the non-secured controlled device 210 or to generate a session key, thereby making the entire home network non-secured. In other words, the connection between the secured control point 220 and the non-secured controlled device 210 is as non-secured as a connection between a non-secured control point (not shown) and the non-secured controlled device 210.

In recent years, various types of secured UPnP devices have been developed to meet the ever-growing demand for providing security in home networks.

Ever since the development of UPnP devices, there has been a need to establish a secured network between secured UPnP devices and non-secured UPnP devices, for example, to establish a secured network where a non-secured controlled device can be securely accessed by a non-secured external control point and where a secured controlled device can be securely accessed by a secured external control point. Therefore, it is necessary develop ways to establish a secured network between secured UPnP devices and non-secured UPnP devices.

SUMMARY OF THE INVENTION

The present invention provides a system and method for establishing a secured home network between a non-secured UPnP device and a secured UPnP device using a virtual UPnP module.

The present invention also provides a system and method for establishing a secured home network by allowing secured external UPnP devices to access a home network while preventing non-secured external UPnP devices from accessing the home network.

According to an aspect of the present invention, there is provided a system for establishing a secured connection between home network devices including a virtual UPnP device creation unit which creates a secured virtual UPnP device for a non-secured UPnP device, an information storage unit which stores correspondence information regarding the non-secured UPnP device and the virtual UPnP device, and a secured communication unit which securely communicates with a secured UPnP device with reference to the correspondence information.

According to another aspect of the present invention, there is provided a home network system including a non-secured UPnP device in a home network, a security gateway which creates a secured virtual UPnP device for the non-secured UPnP device, and a secured external UPnP device which securely communicates with the non-secured UPnP device via the secured virtual UPnP device.

According to still another aspect of the present invention, there is provided a method of establishing a secured connection between home network devices, the method including establishing a non-secured network to a non-secured controlled device, creating a secured virtual controlled device for the non-secured controlled device, establishing a secured network between the non-secured controlled device and a secured external control point via the secured virtual controlled device, receiving a control command message from the secured external control point via the secured network, and transmitting the received control command message to the non-secured controlled device via the non-secured network.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 3A:
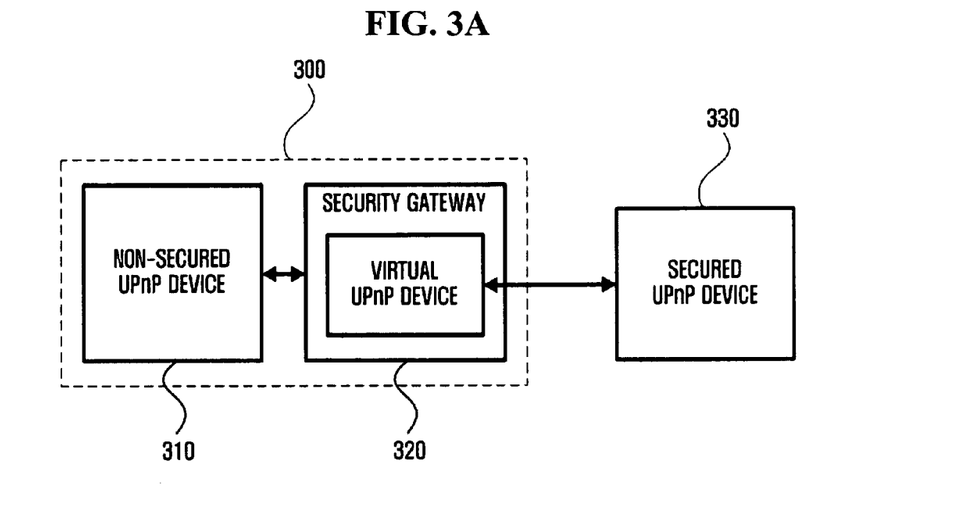
FIG. 3A is a block diagram of a system for establishing a secured connection between home network devices according to an exemplary embodiment of the present invention.

FIG. 3A is a block diagram of a system for establishing a secured connection between home network devices according to an exemplary embodiment of the present invention.

Referring to FIG. 3A, the system includes a non-secured UPnP device 310, a security gateway 320, and a secured external UPnP device 330.

The non-secured UPnP device 310 may be a non-secured controlled device or a non-secured control point, and the secured external UPnP device 330 may be a secured external control point or a secured external controlled device.

The system establishes a secured connection between the non-secured UPnP device 310 and the secured external UPnP device 330 when the secured external UPnP device 330 enters a home network 300 comprising the non-secured UPnP device 310, and thus, the home network 300 may include the security gateway 320.

The security gateway 320 creates a virtual UPnP device corresponding to the non-secured UPnP device 310 via a non-secured network to the non-secured UPnP device 310 and establishes a secured network between the virtual UPnP device and the secured external UPnP device 330 when the secured external UPnP device 330 enters the home network 300.

Accordingly, a secured network is established between the non-secured UPnP device 310 and the secured external UPnP device 330 based on the secured network established between the virtual UPnP device and the secured external UPnP device 330 by the security gateway 320.

Here, the virtual UPnP device may be a secured virtual controlled device or a secured virtual control point.

Figure 3B:
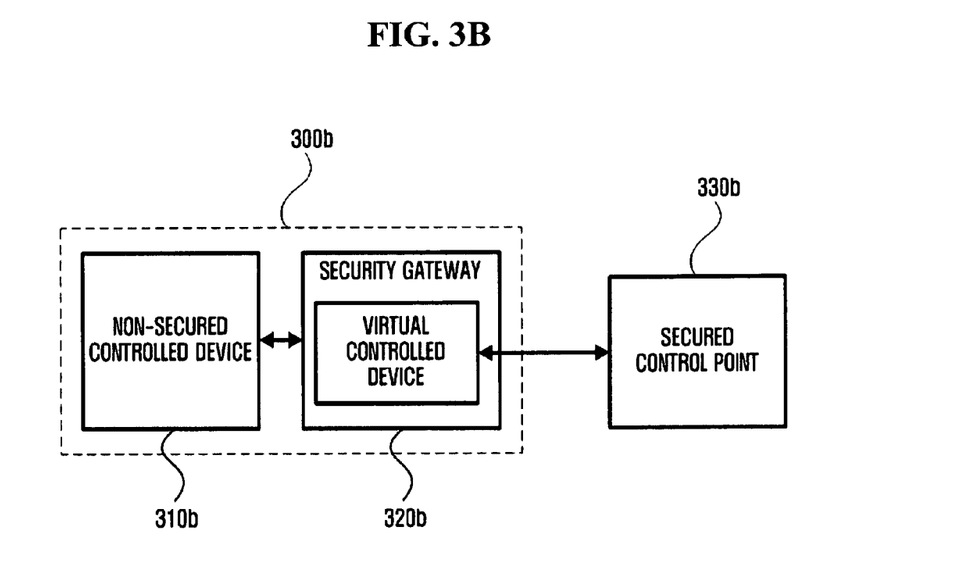
FIG. 3B is a block diagram of a system for establishing a secured connection between a non-secured controlled device and a secured external control point according to an exemplary embodiment of the present invention.

FIG. 3B is a block diagram of a system for establishing a secured connection between a non-secured controlled device 310b and an external control point 330b according to an exemplary embodiment of the present invention.

Referring to FIG. 3B, the security gateway 320b creates a virtual controlled device corresponding to the non-secured controlled device 310b via a non-secured network to the non-secured controlled device 310b and establishes a secured network between the virtual controlled device and the secured external control point 330b.

In detail, the security gateway 320b transmits a discovery message. Thereafter, the security gateway 320b recognizes the presence of the non-secured controlled device 310b when receiving a description message transmitted by the non-secured controlled device 310b in response to the discovery message.

Thereafter, the security gateway 320b generates correspondence information regarding the non-secured controlled device 310b with reference to the description message and stores the correspondence information. Thereafter, the security gateway 320b creates a virtual controlled device corresponding to the non-secured controlled device 310b with reference to the correspondence information stored therein. The virtual controlled device creates a description message with reference to the correspondence information stored in the security gateway 320b and transmits the description message in response to a discovery message received from the secured external control point 330b. Thereafter, the virtual controlled device and the secured external control point 330b exchange a pair of symmetric keys, thereby establishing a secured network therebetween.

Figure 3C:
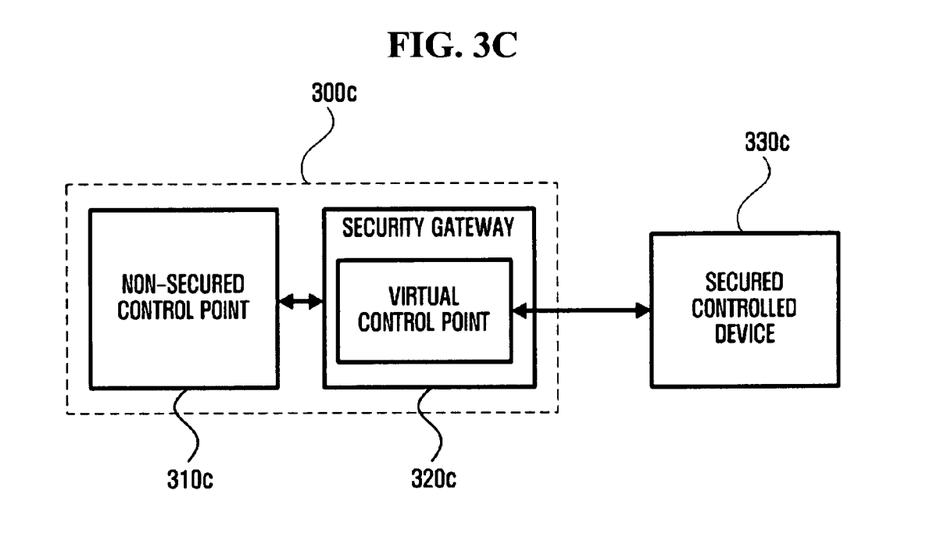
FIG. 3C is a block diagram of a system for establishing a non-secured control point and a secured external controlled device according to an exemplary embodiment of the present invention.

FIG. 3C is a block diagram of a system for establishing a secured connection between a non-secured control point 310c and a secured external controlled device 330c according to an exemplary embodiment of the present invention.

Referring to FIG. 3C, a security gateway 320c creates a virtual control point corresponding to the non-secured control point 310c via a non-secured network to the non-secured control point 310c and establishes a secured network between the virtual control point and the secured external controlled device 330c.

In detail, the security gateway 320c recognizes the presence of the non-secured control point 310c when receiving a discovery message transmitted by the non-secured control point 310c. Thereafter, the security gateway 320c generates correspondence information regarding the non-secured control point 310c with reference to the discovery message and stores the correspondence information.

Thereafter, the security gateway 320c creates a virtual control point corresponding to the non-secured control point 310c with reference to the correspondence information stored therein.

The virtual control point generates a discovery message with reference to the correspondence information stored in the security gateway 320c and transmits the discovery message to the secured external controlled device 330c. The secured external controlled device 330c transmits a description message to the virtual control point and exchanges a pair of symmetric keys with the virtual control point, thus establishing a secured network between the non-secured control point 310c and the secured external controlled device 330c.

Figure 4:
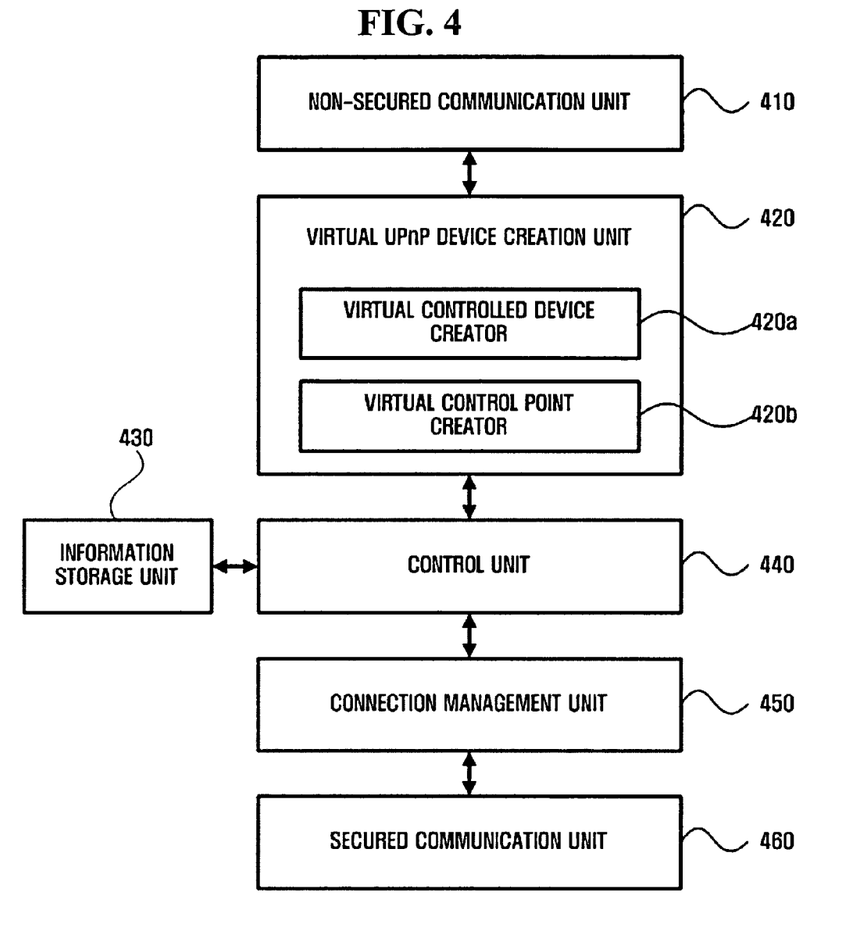
FIG. 4 is a block diagram of a secured gateway according to an exemplary embodiment of the present invention.

FIG. 4 is a block diagram of a security gateway (e.g., security gateway 320) according to an exemplary embodiment of the present invention.

Referring to FIG. 4, the security gateway 320 includes a non-secured communication unit 410, a virtual UPnP device creation unit 420, an information storage unit 430, a control unit 440, a connection management unit 450, and a security communication unit 460.

The non-secured communication unit 410 establishes a non-secured network to a non-secured UPnP device 310 through addressing, discovery, description, control, eventing, and presentation operations. In detail, when a discovery or description message is received from the non-secured UPnP device 310, the non-secured communication unit 410 establishes a non-secured network to the non-secured UPnP device 310 with reference to correspondence information regarding the non-secured UPnP device 310 included in the discovery or description message.

The virtual UPnP device creation unit 420 creates a secured virtual UPnP device corresponding to the non-secured UPnP device 310 and includes a virtual controlled device creator 420a and a virtual control point creator 420b.

If the non-secured UPnP device 310 is a non-secured controlled device in a home network, the virtual controlled device creator 420a creates a virtual controlled device corresponding to the non-secured UPnP device 310.

In detail, when the security gateway 320 transmits a discovery message to the non-secured UPnP device 310, the non-secured UPnP device 310 transmits a description message to the security gateway 320. Thereafter, the security gateway 320 determines the non-secured UPnP device 310 as being a non-secured controlled device with reference to the description message transmitted by the non-secured UPnP device 310 and controls the virtual controlled device creator 420a to create a virtual controlled device.

Then, the virtual controlled device can establish a secured network between the non-secured UPnP device 310 and a secured external control point.

On the other hand, if the non-secured UPnP device 310 is a non-secured control point, the virtual control point creator 420b creates a virtual control point corresponding to the non-secured UPnP device 310.

In detail, when the non-secured UPnP device 310 discovers a non-secured controlled device and transmits a discovery message, the security gateway 320 transmits a description message to the non-secured UPnP device 310 in response to the discovery message. Thereafter, the security gateway 320 determines the non-secured UPnP device 310 as being a non-secured control point with reference to the discovery message transmitted by the non-secured UPnP device 310 and controls the virtual control point creator 420b to create a virtual control point.

The virtual control point establishes a secured network between the non-secured UPnP device 310 and a secured external controlled device 330c.

The information storage unit 430 stores correspondence information regarding the non-secured UPnP device 310 and a virtual UPnP device created by the virtual UPnP device creation unit 420.

The correspondence information includes unique identifier (ID) information, hardware address information, IP address information, service type information, and a secured external UPnP devices list. An example of the correspondence information may be stored in the information storage unit 430 as indicated in the following table.

| Unique ID | Hardware Address | IP address | Service Types | Secured Devices With Control Rights |
|---|---|---|---|---|
| VD00797000001 | 00:07:97:00:D1 | 168.192.0.1 | TV Power<br>TV Channel<br>TV Volume | Security Device 1<br>Security Device 2<br>Security Device 3 |

The unique ID information specifies a unique ID allotted to the virtual UPnP device corresponding to the non-secured UPnP device 310 and may be generated using the hardware address of the non-secured UPnP device 310.

The hardware address information and the IP address information included in the correspondence information are the hardware address and the IP address of the non-secured UPnP device 310.

The service type information specifies types of services provided by the non-secured UPnP device 310, and the secured external UPnP devices list is a list of secured UPnP devices having the right to control the services provided by the non-secured UPnP device 310. The secured external UPnP devices list is generated only if the non-secured UPnP device 310 is a non-secured controlled device. The generation of the secured external UPnP devices list is optional in a case where the non-secured UPnP device 310 is a non-secured control point.

The virtual UPnP device created by the virtual UPnP device creation unit 420 can communicate with a secured external UPnP device with reference to the correspondence information stored in the information storage unit 430.

The connection management unit 450 determines whether to allow an external UPnP device to communicate with the virtual UPnP device created by the virtual UPnP device creation unit 420 according to whether the external UPnP device is secured or non-secured. If the external UPnP device is a secured UPnP device, the connection management unit 450 allows a secured network to be established between the virtual UPnP device and the external UPnP device. However, if the external UPnP device is a non-secured UPnP device, the connection management unit 450 prevents a secured network from being established between the virtual UPnP device and the external UPnP device.

In a case where the external UPnP device is a non-secured UPnP device, the exchange of a key between the external UPnP device and the virtual UPnP device and the setting of a session key for creating a secured session are not carried out after discovery and description operations. Therefore, the connection management unit 450 may determine whether the external UPnP device is secured or non-secured according to whether the exchange of secured messages between the virtual UPnP device and the external UPnP device has been carried out.

The security communication unit 460 securely communicates with the external UPnP device through addressing, discovery, description, control, eventing, presentation, and security key exchange operations.

The security communication unit 460 establishes a secured network to the external UPnP device with reference to the correspondence information stored in the information storage unit 430.

The control unit 440 controls the non-secured communication unit 410, the virtual UPnP device creation unit 420, the information storage unit 430, the connection management unit 450, the security communication unit 460, and other parts of the security gateway 320.

Figure 5:
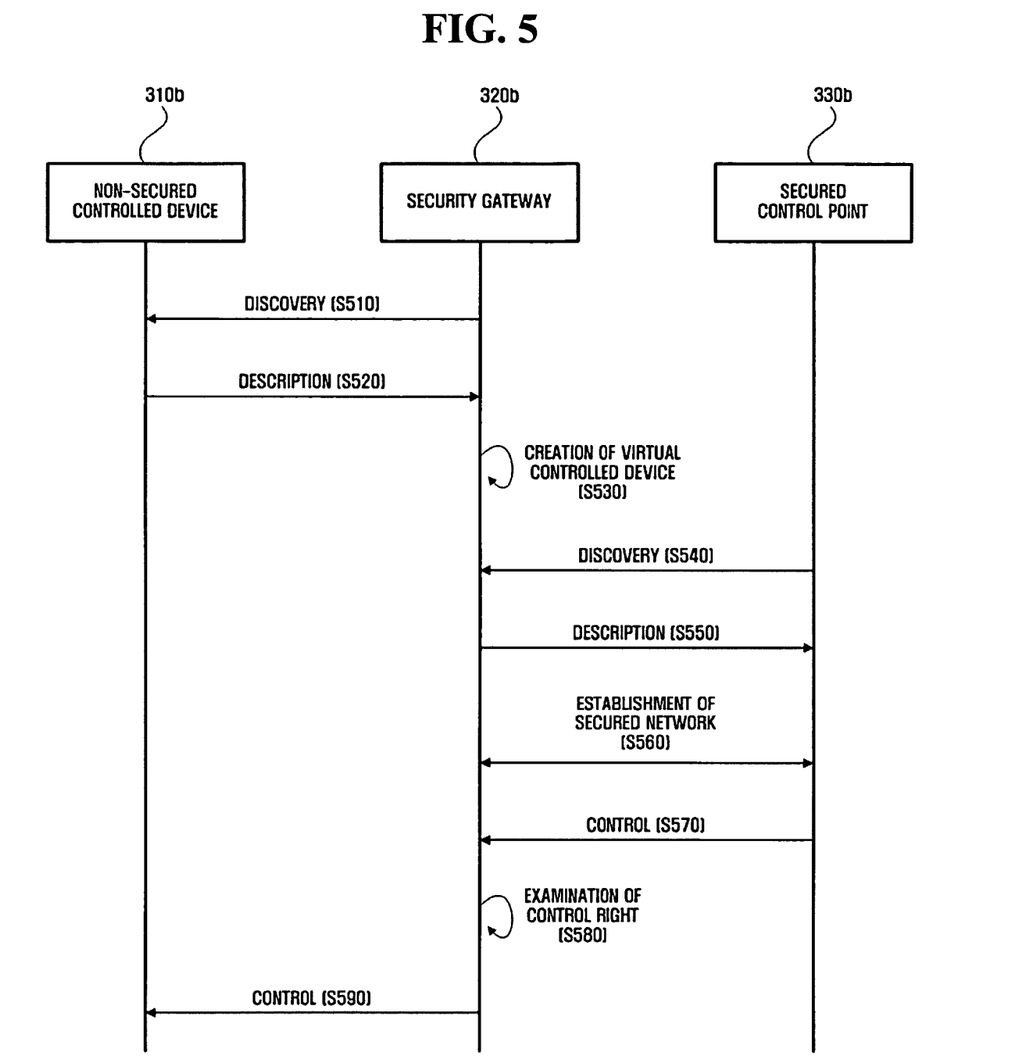
FIG. 5 is a flowchart illustrating a method of establishing a secured connection between a non-secured controlled device and a secured external control point according to an exemplary embodiment of the present invention.

FIG. 5 is a flowchart illustrating a method of establishing a secured connection between a non-secured controlled device and a secured external control point according to an exemplary embodiment of the present invention.

Referring to FIG. 5, in operation S510, if a non-secured UPnP device constituting a home network is a non-secured controlled device 310b, a security gateway 320b serves as a control point, and a non-secured communication unit of the security gateway 320b transmits a discovery message.

In operation S520, the non-secured controlled device 310b responds to the security gateway 320b by transmitting a description message containing its detailed information to the security gateway 320b. The security gateway 320b establishes a non-secured network to the non-secured controlled device 310b with reference to the description message and generates correspondence information regarding the non-secured controlled device 310b and stores the correspondence information in an information storage unit. The correspondence information includes unique ID information, hardware address information, IP address information, service type information, and a secured external UPnP devices list. The ID information is generated using the hardware address information of the non-secured controlled device 310b, thereby distinguishing other types of non-secured controlled devices 310a.

In operation S530, the security gateway 320b creates a virtual controlled device with reference to the correspondence information and stands by until receiving a discovery message from a secured external control point 330b.

In operation S540, the security gateway 320b receives a discovery message from the secured external control point 330b. In operation S550, the security gateway 320b generates a description message with reference to the correspondence information and transmits the description message. In operation S560, the security gateway 320b establishes a secured network between the virtual controlled device and the secured external control point 330b through the exchange of a pair of symmetric keys.

In operation S570, once the secured network is established between the virtual controlled device and the secured external control point 330b, the secured external control point 330b transmits a control message to the security gateway 320b. In operation S580, the virtual controlled device created by the security gateway 320b determines whether the control message has the right to control the non-secured controlled device 310b with reference to an ACL included in the correspondence information. In operation S590, if the control message is determined in operation S580 to have the right to control the non-secured controlled device 310b, the virtual controlled device transfers the control message to the non-secured controlled device 310b. Otherwise, the method is complete.

Figure 6:
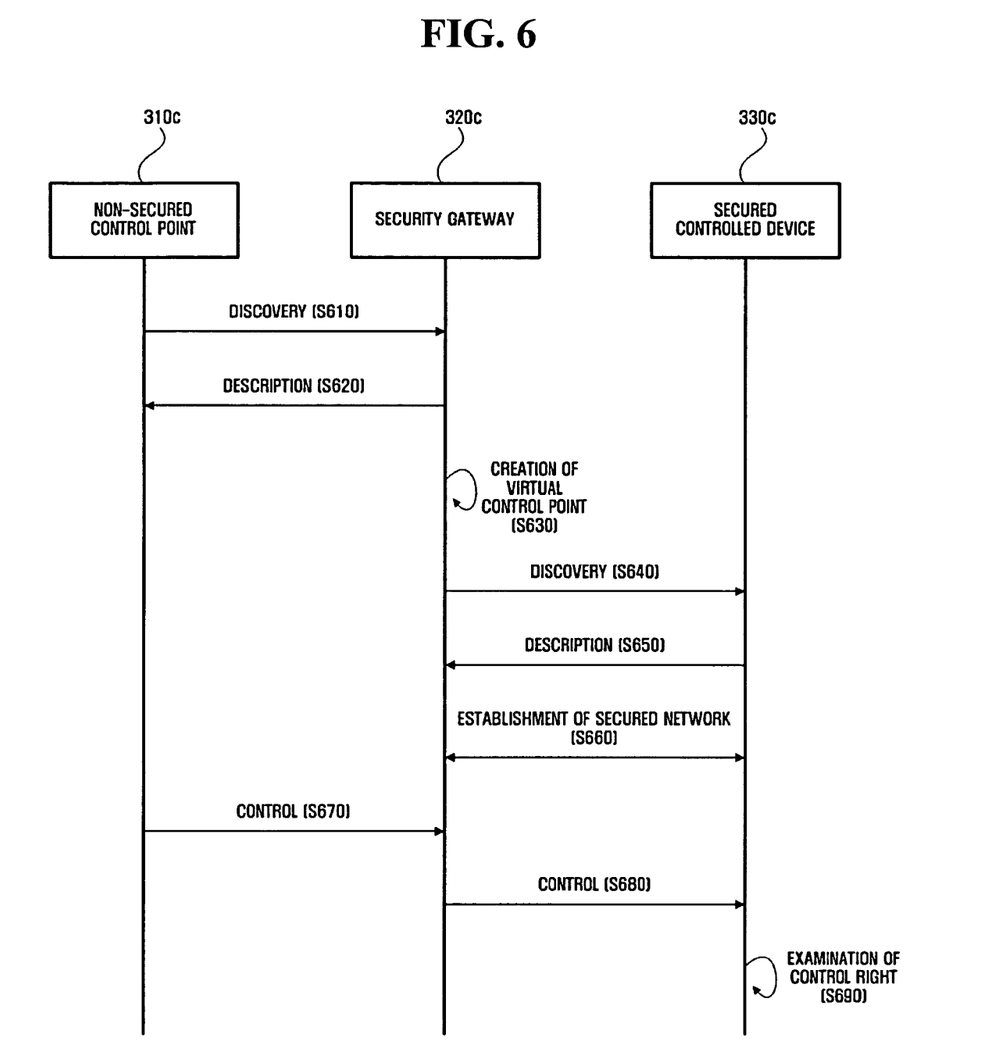
FIG. 6 is a flowchart illustrating a method of establishing a non-secured control point and a secured external controlled device according to an exemplary embodiment of the present invention.

FIG. 6 is a flowchart illustrating a method of establishing a secured connection between a non-secured control point and a secured external controlled device according to an exemplary embodiment of the present invention.

If a non-secured UPnP device constituting a home network is a non-secured control point 310c, a security gateway 320c serves as a controlled device while standing by until receiving a discovery message from the non-secured control point 310c.

In operation S610, the security gateway 320c receives a discovery message from the non-secured control point 310c. In operation S620, the security gateway 320c transmits a description message to the non-secured control point 310c. Thereafter, the security gateway 320c establishes a non-secured network to the non-secured control point 310c with reference to the discovery message and generates correspondence information regarding the non-secured control point 310c. As described above, the correspondence information includes unique identifier (ID) information, hardware address information, IP address information, service type information, and a secured external UPnP devices list. However, the correspondence information may not include service type information specifying the types of services provided by the non-secured control point 310c or a secured external UPnP device list including a plurality of secured external UPnP devices having the right to control the services provided by the non-secured control point 310c.

Unique ID information included in the correspondence information may be generated based on a hardware address of the non-secured control point 310c, thereby differentiating the non-secured control point 310c from other non-secured control points.

In operation S630, the security gateway 320c creates a virtual control point with reference to the correspondence information. In operation S640, the security gateway 320c transmits a discovery message to a secured external controlled device 330c.

In operation S650, the secured external controlled device 330c responds to the security gateway 320c by transmitting a description message containing its detailed description in response to the discovery message. In operation S660, the secured external controlled device 330c establishes a secured network to the security gateway 320c through the exchange of a pair of symmetric keys.

In operation S670, the security gateway 320c receives a control message from the non-secured control point 310c. In operation S680, the security gateway 320c transfers the control message to the secured external controlled device 330c.

In operation S690, the secured external controlled device 330c determines with reference to an ACL stored therein whether the control message has the right to control the secured external controlled device 330c. If the control message is determined in operation S690 to have the right to control the secured external controlled device 330c, a control command specified in the control message is executed. Otherwise, the method is complete.

Figure 7:
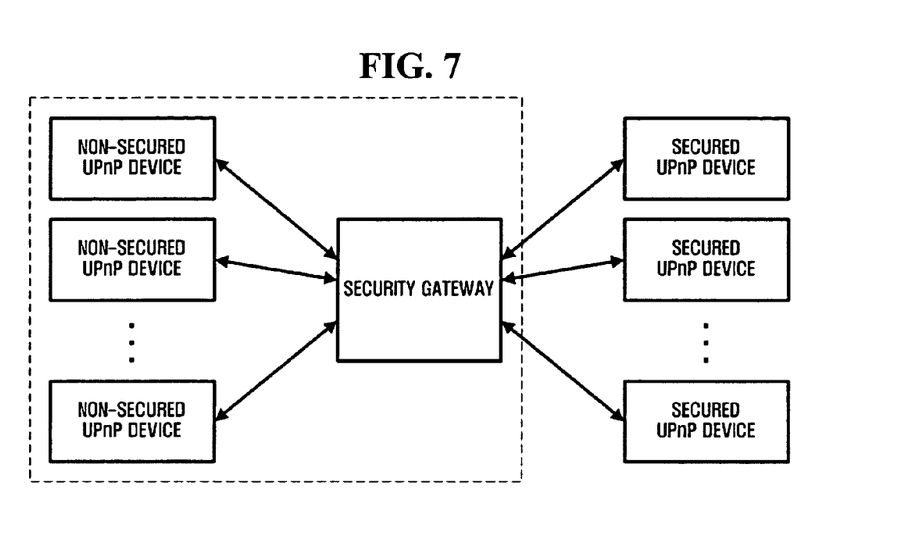
FIG. 7 is a diagram illustrating a plurality of non-secured UPnP devices communicating with a plurality of secured external UPnP devices via a single security gateway according to an exemplary embodiment of the present invention.

FIG. 7 is a diagram illustrating a plurality of non-secured UPnP devices communicating with a plurality of external UPnP devices via a single security gateway according to an exemplary embodiment of the present invention.

Referring to FIG. 7, a security gateway may serve as a communication path to one or more non-secured UPnP devices constituting a home network.

The security gateway may differentiate the non-secured UPnP devices from one another with reference to respective corresponding pieces of unique ID information included in correspondence information stored therein. The security gateway generates a plurality of virtual UPnP devices for the respective non-secured UPnP devices and establishes secured networks between the virtual UPnP devices and secured external UPnP devices.

Figure 8:
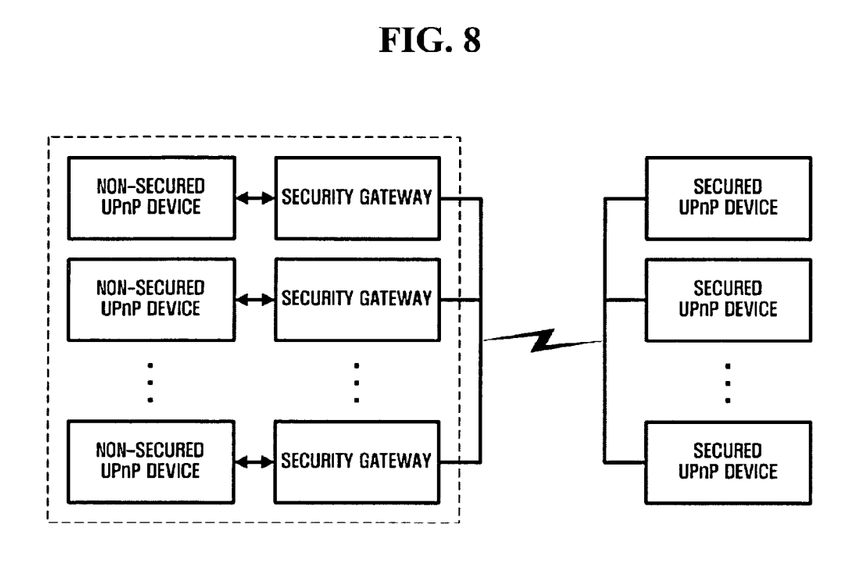
FIG. 8 is a diagram illustrating a plurality of non-secured UPnP devices communicating with a plurality of secured external UPnP devices via respective corresponding security gateways according to an exemplary embodiment of the present invention.

FIG. 8 is a diagram illustrating a plurality of non-secured UPnP devices communicating with a plurality of secured external UPnP devices via respective corresponding security gateways according to an exemplary embodiment of the present invention.

Referring to FIG. 8, a security gateway serves a communication path to only one of a plurality of non-secured UPnP devices constituting a home network.

The security gateway can determine which of the non-secured UPnP devices is allotted thereto with reference to unique ID information included in correspondence information stored therein. The security gateway creates a virtual UPnP device only for the non-secured UPnP device allotted thereto and establishes a secured network between the virtual UPnP device and a secured external UPnP device.

As described above, according to the present invention, it is possible to establish a home network between non-secured UPnP device and a secured UPnP device using a virtual UPnP device.

In addition, it is possible to manage the security of a home network by allowing a secured external UPnP device to access the home network while preventing a non-secured external UPnP device from accessing the home network.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A system for establishing a secured connection between home network devices, the system comprising:
    a virtual Universal Plug and Play (UPnP) device creation unit which creates a secured virtual UPnP device for a non-secured UPnP device;
    an information storage unit which stores correspondence information regarding the non-secured UPnP device and the secured virtual UPnP device; and
    a secured communication unit which securely communicates with a secured UPnP device with reference to the correspondence information.

2. The system of claim 1, wherein the virtual UPnP device creation unit comprises:
    a virtual control point creator which creates a secured virtual control point for a non-secured control point; and
    a virtual controlled device creator which creates a secured virtual controlled device for a non-secured controlled device.

3. The system of claim 1, wherein the correspondence information comprises unique identifier (ID) information, hardware address information, Internet Protocol (IP) address information, service type information, and a secured external UPnP device list.

4. The system of claim 3, wherein the unique ID information specifies an ID which is generated using the hardware address information and then allotted to the secured virtual UPnP device.

5. The system of claim 1 further comprising a connection management unit which determines whether to allow an external UPnP device to communicate with the secured virtual UPnP device according to whether the external UPnP device is secured or non-secured.

6. The system according to claim 1, wherein the created secured virtual UPnP device corresponds to the non-secured UPnP device.

7. The system according to claim 1, wherein the created secured virtual UPnP device corresponds to a single non-secured UPnP device.

8. A home network system comprising:
 a non-secured Universal Plug and Play (UPnP) device in a home network;
 a security gateway which creates a secured virtual UPnP device for the non-secured UPnP device; and
 a secured external UPnP device which securely communicates with the non-secured UPnP device via the secured virtual UPnP device.

9. The home network system of claim 8, wherein the security gateway creates at least one secured virtual UPnP device for at least one non-secured UPnP device.

10. A method of establishing a secured connection between home network devices, the method comprising:
 establishing a non-secured network to a non-secured controlled device;
 creating a secured virtual controlled device for the non-secured controlled device;
 establishing a secured network to a secured external control point via the secured virtual controlled device;
 receiving a control command message from the secured external control point through the secured network; and
 transmitting the control command message which is received to the non-secured controlled device through the non-secured network.

11. The method of claim 10, wherein the establishing of the non-secured network comprises:
 receiving a description message for a discovery message previously transmitted to the non-secured controlled device from the non-secured controlled device; and
 establishing a non-secured network with reference to the description message which is received.

12. The method of claim 10, where the establishing of the secured network comprises:
 generating and storing correspondence information regarding the non-secured controlled device and the secured virtual controlled device;
 transmitting a description message for a discovery message previously received using the correspondence information to the secured external control point; and
 establishing a secured network to the secured external control point with reference to the discovery message.

13. A method of establishing a secured connection between home network devices comprising:
 establishing a non-secured network to a non-secured control point;
 creating a secured virtual control point for the non-secured control point;
 establishing a secured network between to a secured external controlled device via the secured virtual control point;
 receiving a control command message from the non-secured control point through the non-secured network; and
 transmitting the control command message to the secured external controlled device through the secured network.

14. The method of claim 13, wherein the establishing of the non-secured network comprises:
 transmitting a description message for a discovery message previously received to the non-secured control point to the non-secured control point; and
 establishing a non-secured network with reference to the discovery message.

15. The method of claim 13, where the establishing of the secured network comprises:
 generating and storing correspondence information regarding the non-secured control point and the secured virtual control point;
 receiving a description message for a discovery message previously transmitted to the secured external controlled device from the secured external controlled device with reference to the stored correspondence information; and
 establishing a secured network to the secured external controlled device with reference to the received description message.

* * * * *